(12) United States Patent
Pullium, III et al.

(10) Patent No.: US 8,084,691 B2
(45) Date of Patent: Dec. 27, 2011

(54) SEALANT-FILLED ENCLOSURES AND METHODS FOR ENVIRONMENTALLY PROTECTING A CONNECTION

(75) Inventors: George W. Pullium, III, Garner, NC (US); Jimmy E. Marks, Dunn, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 273 days.

(21) Appl. No.: 12/619,965

(22) Filed: Nov. 17, 2009

(65) Prior Publication Data

US 2010/0122827 A1  May 20, 2010

Related U.S. Application Data

(60) Provisional application No. 61/115,746, filed on Nov. 18, 2008.

(51) Int. Cl.
*H02G 15/08* (2006.01)
(52) U.S. Cl. ........ 174/92; 174/77 R; 174/88 R; 439/519
(58) Field of Classification Search ................ 174/84 R, 174/88 R, 92, 138 F, 77 R; 439/519, 521
See application file for complete search history.

(56) References Cited

U.S. PATENT DOCUMENTS

| | | |
|---|---|---|
| 3,325,591 A | 6/1967 | Wahl |
| 3,484,541 A | 12/1969 | Campbell |
| 3,715,459 A | 2/1973 | Hoffman |
| 3,879,575 A | 4/1975 | Dobbin et al. |
| 3,934,076 A | 1/1976 | Smith |
| 4,451,696 A | 5/1984 | Beinhaur |
| 4,849,580 A | 7/1989 | Reuter |
| 4,859,809 A | 8/1989 | Jervis |
| 4,880,676 A | 11/1989 | Puigcerver et al. |
| 4,909,756 A | 3/1990 | Jervis |
| 5,099,088 A | 3/1992 | Usami et al. |
| 5,129,839 A | 7/1992 | VanSkiver |
| 5,140,746 A | 8/1992 | Debbaut |
| 5,347,084 A | 9/1994 | Roney et al. |

(Continued)

FOREIGN PATENT DOCUMENTS

EP  1 760 856 A1  3/2007
(Continued)

OTHER PUBLICATIONS

Notification of Transmittal of the International Search Report and the Written Opinion of the International Searching Authority, or the Declaration in corresponding PCT Application No. PCT/US2009/064778 mailed Jun. 1, 2011 (14 pages).

*Primary Examiner* — Dhiru R Patel
(74) *Attorney, Agent, or Firm* — Myers Bigel Sibley & Sajovec, PA

(57) ABSTRACT

A sealant-filled enclosure assembly for environmentally protecting a connection includes a housing, a mass of sealant and a sealant valve mechanism. The housing includes a main cavity to receive the connection. The mass of sealant is disposed in the main cavity. The sealant valve mechanism includes an overflow chamber and a gate member between the main cavity and the overflow chamber. The gate member is selectively positionable in each of a closed position, wherein the gate member substantially prevents displacement of the sealant from the main cavity to the overflow chamber, and an open position, wherein the gate member permits displacement of the sealant from the main cavity to the overflow chamber.

21 Claims, 15 Drawing Sheets

U.S. PATENT DOCUMENTS

| | | | |
|---|---|---|---|
| 5,397,859 A | 3/1995 | Robertson et al. | |
| 5,561,269 A | 10/1996 | Robertson et al. | |
| 5,569,882 A | 10/1996 | Yokoyama et al. | |
| 5,594,210 A | 1/1997 | Yabe | |
| 5,763,835 A | 6/1998 | Huynh-Ba et al. | |
| 5,828,005 A | 10/1998 | Huynh-Ba et al. | |
| 6,169,250 B1 | 1/2001 | Bolcato | |
| 6,265,665 B1 | 7/2001 | Zahnen | |
| 6,333,463 B1 | 12/2001 | Bukovnik et al. | |
| 7,138,580 B2 | 11/2006 | Boutin | |
| 7,304,244 B1 * | 12/2007 | Dower et al. | 174/92 |
| 7,341,479 B2 | 3/2008 | Boutin | |
| 7,504,584 B2 * | 3/2009 | Ide | 174/92 |
| 7,798,837 B1 * | 9/2010 | Gardner et al. | 439/296 |
| 7,799,995 B2 * | 9/2010 | Mullaney et al. | 174/77 R |

FOREIGN PATENT DOCUMENTS

| | | |
|---|---|---|
| JP | 2009/148010 A | 7/2009 |
| WO | WO 96/02078 A1 | 1/1996 |
| WO | WO 97/05671 A1 | 2/1997 |
| WO | WO 00/67354 A1 | 11/2000 |

* cited by examiner

SEALANT-FILLED ENCLOSURES AND METHODS FOR ENVIRONMENTALLY PROTECTING A CONNECTION

RELATED APPLICATION(S)

The present application claims the benefit of and priority from U.S. Provisional Patent Application Ser. No. 61/115,746, filed Nov. 18, 2008, the disclosure of which is incorporated herein by reference.

FIELD OF THE INVENTION

The present invention relates to environmentally protective enclosures and, more particularly, to enclosures for environmentally protecting cable connections and the like.

BACKGROUND OF THE INVENTION

Sealant-filled environmentally protective enclosures are employed to protect cable connections. Such enclosures may be used to environmentally protect the connections between telecommunications signal transmission cables, the electrical power transmission cables, etc. For example, U.S. Pat. No. 5,763,835 to Huynh-Ba et al. discloses a gel-filled enclosure including a pair of cavitied bodies that are hingedly connected and closable in clam shell fashion. When the enclosure is closed about the cables, gel is typically displaced and thereby elongated and seals about a cable splice or the like.

However, such enclosures are typically adapted to suitably seal about a limited range of connection/cable sizes. Additionally, for relatively large connections and cables, the force required to close an enclosure about the connection/cables may be unduly large. However, such enclosures are typically adapted to suitably seal about a limited range of connection/cable sizes. Additionally, for relatively large connections and cables, the force required to close an enclosure about the connection/cables may be unduly large. In general, for larger enclosures and cable/connector volumes, there may be large difference in volume from the minimum to the maximum intended cable/connector configurations. As a result, it may be difficult to provide an amount of gel in the enclosure sufficient to properly seal the smallest intended configuration but which will still allow the operator to easily close the enclosure. When a large volume of gel must be displaced to accommodate a large cable/connector, the gel may extrude through an end of the enclosure or even climb over side walls (in which case, the gel may accumulate at a latch area). These actions may generate substantial internal pressure in the enclosure that makes the enclosure difficult to close.

SUMMARY OF THE INVENTION

According to embodiments of the present invention, a sealant-filled enclosure assembly for environmentally protecting a connection includes a housing, a mass of sealant and a sealant valve mechanism. The housing includes a main cavity to receive the connection. The mass of sealant is disposed in the main cavity. The sealant valve mechanism includes an overflow chamber and a gate member between the main cavity and the overflow chamber. The gate member is selectively positionable in each of a closed position, wherein the gate member substantially prevents displacement of the sealant from the main cavity to the overflow chamber, and an open position, wherein the gate member permits displacement of the sealant from the main cavity to the overflow chamber.

According to method embodiments of the present invention, a method for environmentally protecting a connection includes providing a sealant-filled enclosure assembly. The sealant-filled enclosure assembly includes a housing, a mass of sealant and a sealant valve mechanism. The housing includes a main cavity to receive the connection. The mass of sealant is disposed in the main cavity. The sealant valve mechanism includes an overflow chamber and a gate member between the main cavity and the overflow chamber. The gate member is selectively positionable in each of a closed position, wherein the gate member substantially prevents displacement of the sealant from the main cavity to the overflow chamber, and an open position, wherein the gate member permits displacement of the sealant from the main cavity to the overflow chamber. The method further includes: placing the connection in the main cavity; transitioning the gate member from the closed position to the open position; and displacing a portion of the sealant from the main cavity to the overflow chamber.

Further features, advantages and details of the present invention will be appreciated by those of ordinary skill in the art from a reading of the figures and the detailed description of the embodiments that follow, such description being merely illustrative of the present invention.

DETAILED DESCRIPTION OF EMBODIMENTS OF THE INVENTION

Figure 1:
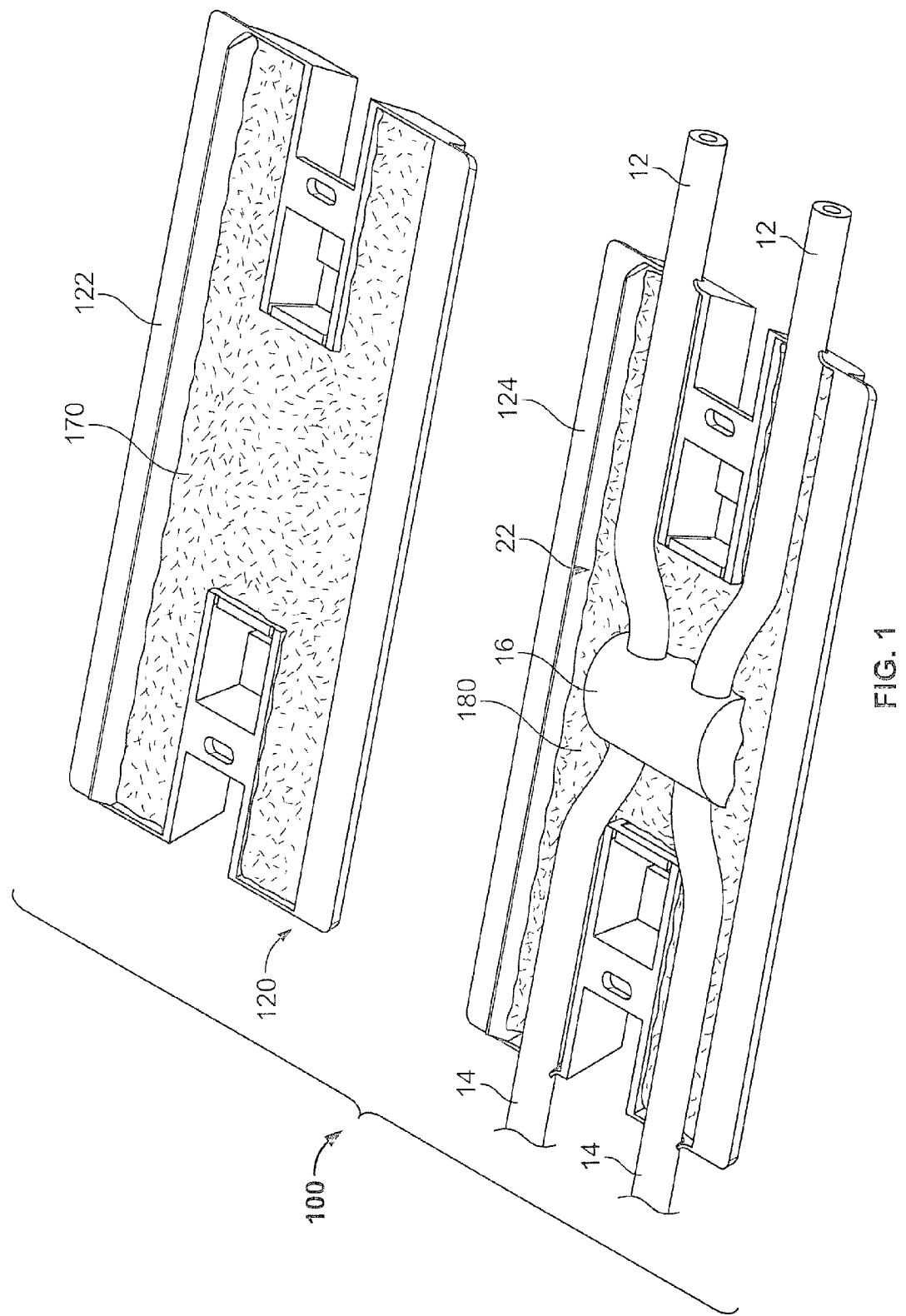
FIG. 1 is a top perspective view of a sealant-filled enclosure assembly according to embodiments of the present invention in an open position and with a connection partially installed therein.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

According to embodiments of the present invention, a sealant-filled enclosure assembly for protecting a connection includes a housing defining a main cavity, a mass of sealant disposed in the main cavity, and a sealant valve mechanism. The sealant valve mechanism includes an overflow chamber, and a gate member between the main chamber and the overflow chamber and selectively positionable in each of a closed position, wherein the gate member prevents displacement of the sealant from the main cavity to the overflow chamber, and an open position wherein the gate member permits displacement of the sealant from the main cavity to the overflow chamber.

With reference to FIGS. 1-10, a sealant-filled enclosure assembly 100 according to some embodiments of the present invention is shown therein. The enclosure assembly 100 is adapted to form a sealed enclosure about a connection and/or cables or the like. For example, the enclosure assembly 100 may be used to form an environmentally protective enclosure about a plurality of cables 12, 14 (e.g., electrical power lines) joined by a connector 16 to form a connection assembly 9 as best shown in FIGS. 6-10.

Figure 6:
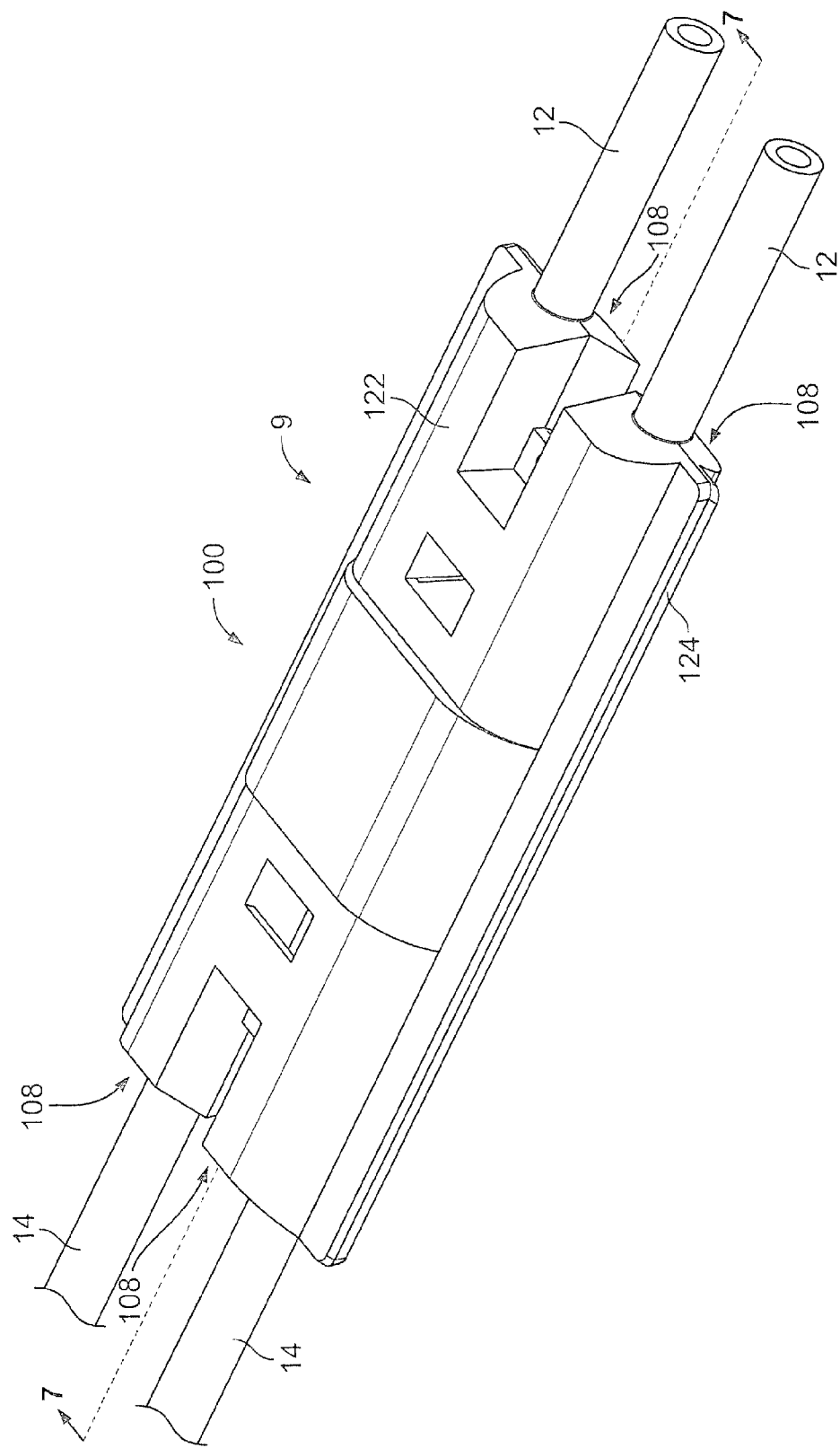
FIG. 6 is a top perspective view of the sealant-filled enclosure assembly of FIG. 1 installed about the connection to form a connection assembly.

With reference to FIG. 1, the sealant-filled enclosure 100 includes a housing 120 including a first shell or cover member 122 and a second shell or cover member 124 adapted to be relatively positioned between an open position as shown in FIG. 1 and a closed position as shown in FIG. 6. Optionally, the cover members 122, 124 can be joined by a hinge (e.g., a living hinge). Masses of sealant 170, 180 are disposed in the cover members 122, 124. According to some embodiments, and as discussed in more detail below, each of the sealants 170, 180 may be a gel. In the open position, the enclosure assembly 100 can receive the connector 16 and adjacent portions of the conductors 12, 14. In the closed position, the enclosure assembly 100, including the sealants 170, 180, may operate to seal about and environmentally protect the connector 16. In the closed position, the enclosure assembly 100 defines an enclosure cavity 106 (FIGS. 7 and 9) and opposed pairs of ports 108 (FIG. 6) communicating with the enclosure cavity 106.

Turning to the housing 120 in more detail and as best seen in FIGS. 2-5, the cover members 122, 124 are constructed in generally the same manner. Each cover member 122, 124 includes a bottom wall 130. Opposed side walls 132 and opposed end walls 134 extend upwardly from the bottom wall 130. Opposed pairs of port extensions 140 extend longitudinally from either end of each cover member 122, 124. Each port extension 140 is terminated by a port wall 142. According to other embodiments, the port walls 142 may be frangible. For example, the port walls 142 may include corrugations comprising a series of fingers joined by relatively thin membranes as shown. According to other embodiments, the port walls may be rigid or semi-rigid breakaway panels releasably secured closed by frangible regions.

The upper edges of the walls 132, 134 form a perimeter edge 138 defining an opening 138A. The walls 130, 132, 134 and the port extensions 140 of each cover member 122, 124 define an overall cover member chamber or cavity 136 communicating with opening 138A. The cavity 136 includes a main cavity portion 136A and conductor port subchannels 136B defined within each port extension 140.

Figure 7:
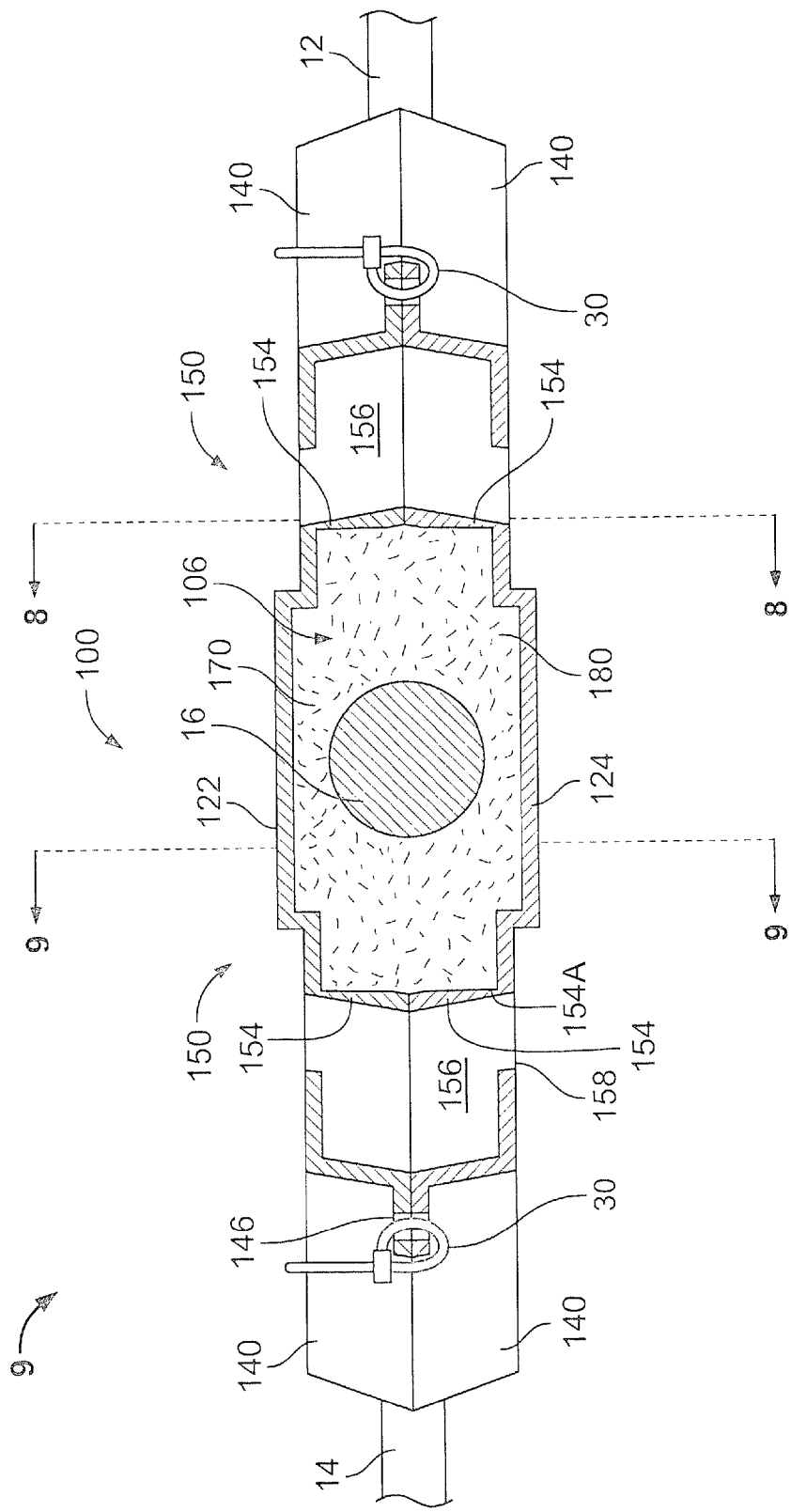
FIG. 7 is a cross-sectional view of the connection assembly of FIG. 6 taken along the line 7-7 of FIG. 6, wherein the gate members of the sealant-filled enclosure assembly are in their closed positions.

Opposed tie slots 146 are defined in each cover member 122, 124. Ties 30 can be used to secure the cover members 122, 124 together as shown in FIGS. 6 and 7. Other mechanisms may be used to secure the cover members 122, 124 together such as snaps or latches.

Each cover member 122, 124 further includes an adjustable sealant volume control system 151. Each system 151 includes a pair of opposed sealant valve mechanisms 150 each located between a respective pair of the port subchannels 136B. The mechanisms 150 may be constructed and operate in substantially the same manner and, therefore, only one of the mechanisms 150 will be described in detail hereinafter, it being appreciated that such description likewise applies to the other mechanism 150.

Figure 2:
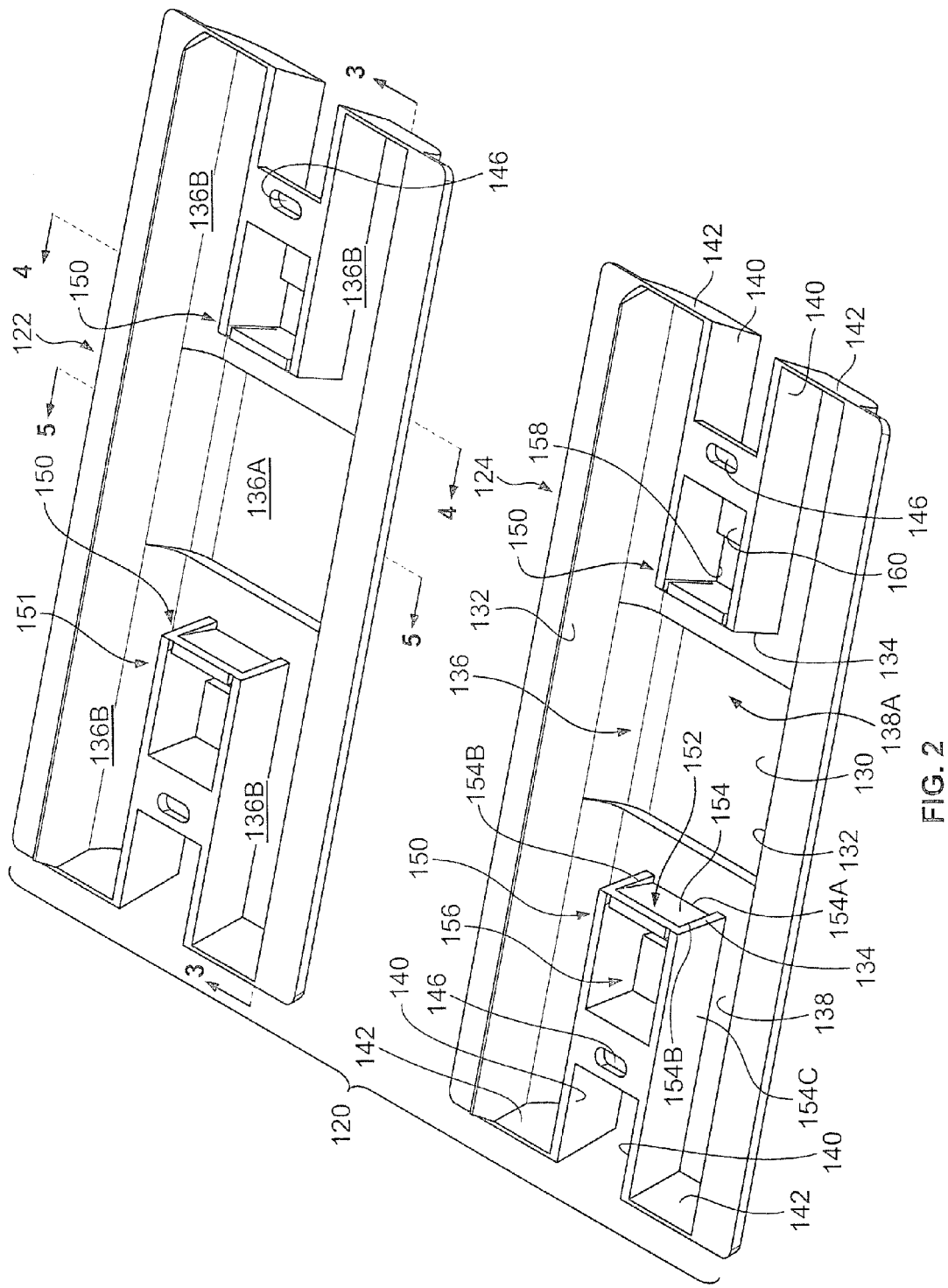
FIG. 2 is a top perspective view of a housing forming a part of the sealant-filled enclosure assembly of FIG. 1 in an open position.
Figure 3:
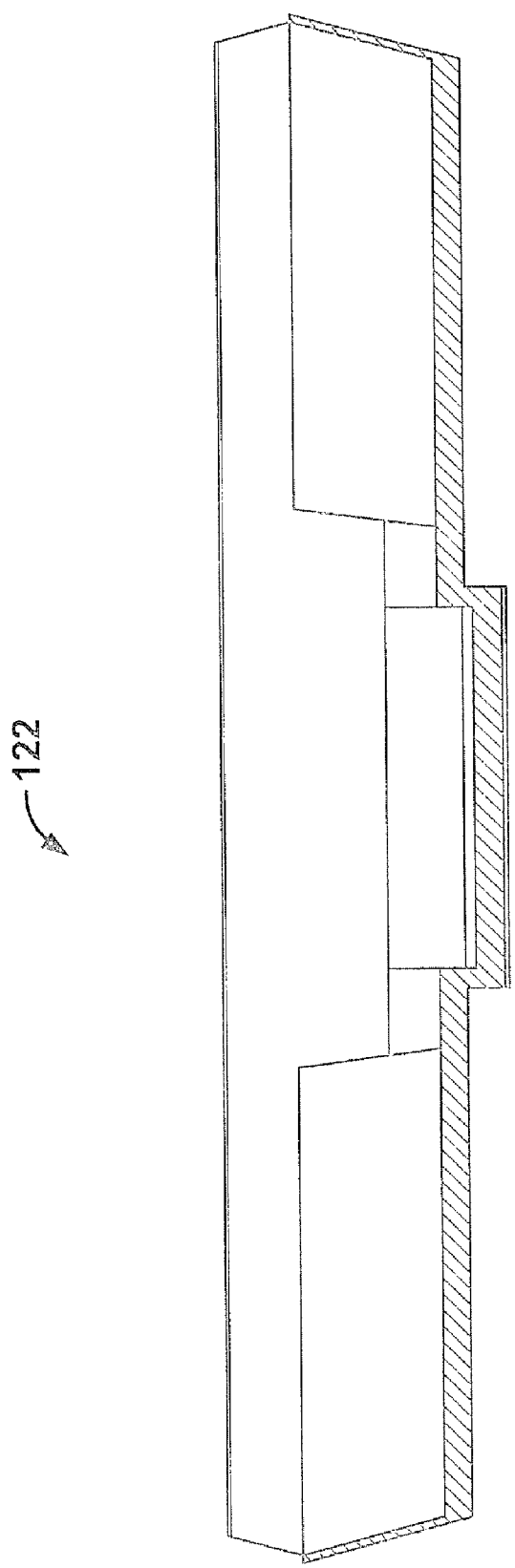
FIG. 3 is a cross-sectional view of the housing of FIG. 2 taken along the line 3-3 of FIG. 2.
Figure 4:
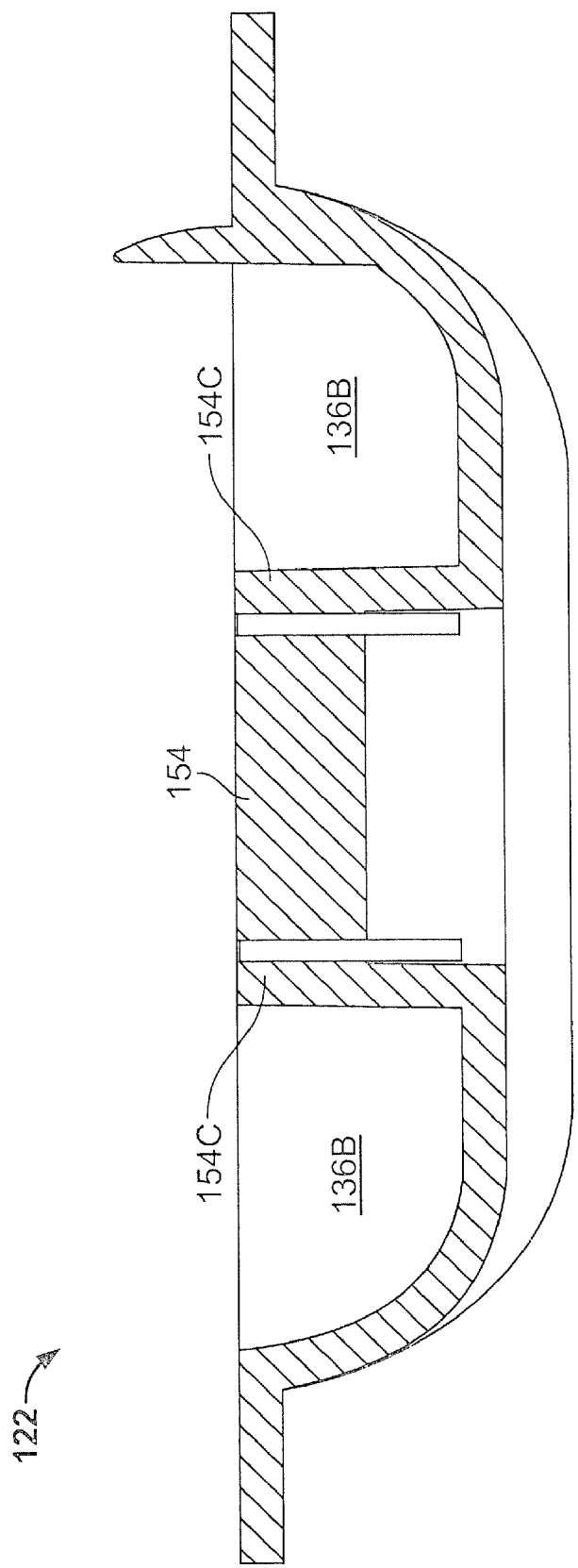
FIG. 4 is a cross-sectional view of the housing of FIG. 2 taken along the line 4-4 of FIG. 2.
Figure 5:
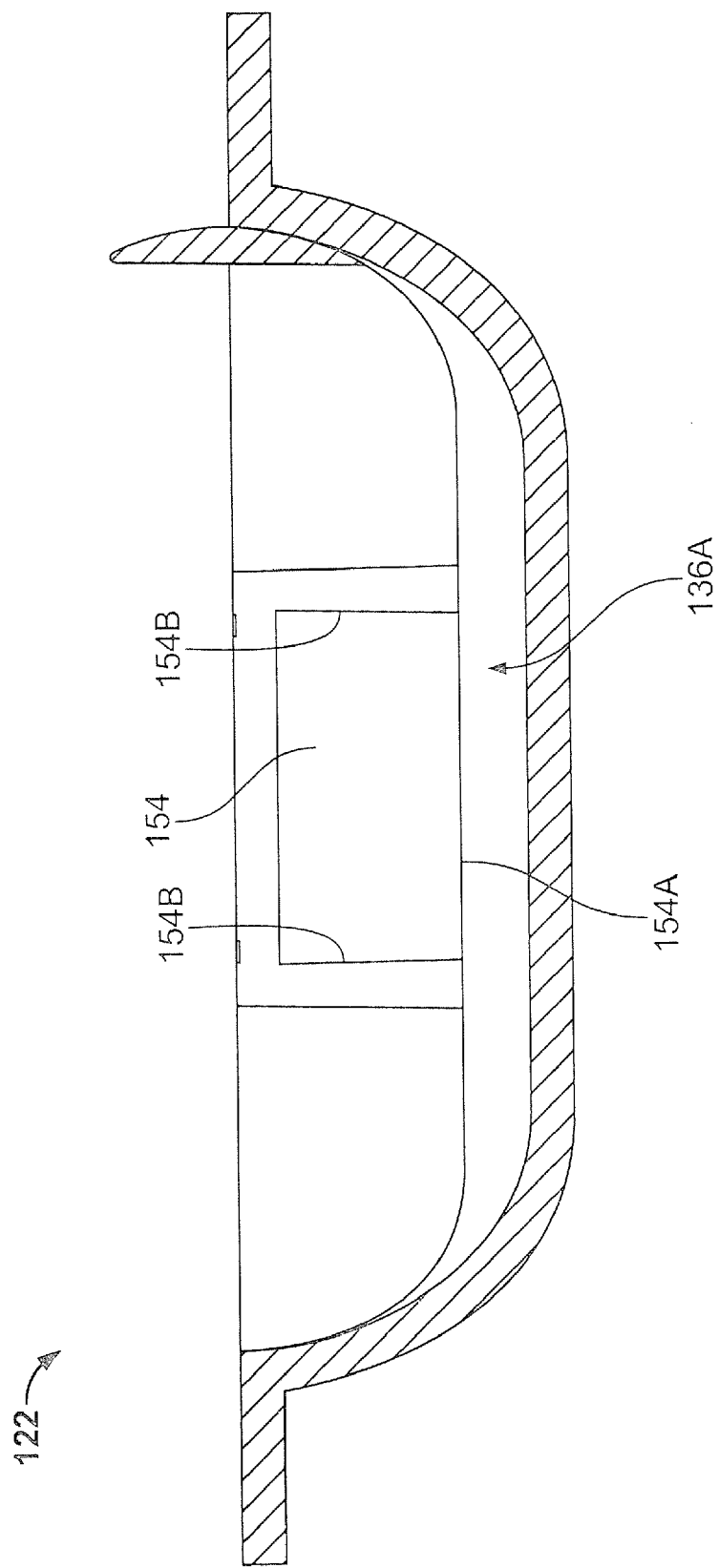
FIG. 5 is a cross-sectional view of the housing of FIG. 2 taken along the line 5-5 of FIG. 2.

The sealant valve mechanism 150 includes an overflow chamber 156 and a valve port 152 fluidly connecting the chamber 156 with the cavity 136. The mechanism 150 further includes a gate member 154 that, in a closed position as shown in FIG. 2, spans the port 152 (FIGS. 2 and 10) to prevent or substantially eliminate fluid communication between the chamber 156 and the cavity 136. The gate member 154 may be a substantially rigid member or panel. The gate member 154 is pivotally joined to the bottom wall of the cover member 122, 124 by a hinge 154A (e.g., a living hinge: FIG. 2). Frangible connector portions 154B releasably secure the gate member 154 to sidewalls 154C to hold the gate member 154 in the closed position. When the connector portions 154B are severed, the gate member 154 can be pivoted about the hinge 154A into one or more open positions to provide fluid communication between the cavity 136 and the chamber 156 through the port 152. The mechanism 150 further includes an outlet 158 to the environment and a base stop wall 160.

The housing 120 may be formed of any suitable material. According to some embodiments, the housing 120 is formed of or with an electrically insulative material. In some embodiments, the housing 120 is formed of a vacuum formed or molded polymeric material. The housing 120 may be formed of polypropylene, nylon, polyethylene, ABS and/or PMMA. The housing 120 may be formed of a flame retardant material. The housing material may be any color or transparent.

Prior to use, the sealant 170 may be contained in the cavity 136 of the cover member 122 such that a main sealant portion of the sealant is disposed in the main cavity 136 and port sealant portions are disposed in the port subchannels 136B. Prior to use, the sealant 180 may be contained in the cavity 136 of the cover member 124 such that a main sealant portion of the sealant is disposed in the main cavity 136 and port sealant portions are disposed in the port subchannels 136B.

The sealants 170, 180 may be any suitable sealants. According to some embodiments, the sealants 170, 180 are gel sealants. As used herein, "gel" refers to the category of materials which are solids extended by a fluid extender. The gel may be a substantially dilute system that exhibits no steady state flow. As discussed in Ferry, "Viscoelastic Properties of Polymers," $3^{rd}$ ed. P. 529 (J. Wiley & Sons, New York 1980), a polymer gel may be a cross-linked solution whether linked by chemical bonds or crystallites or some other kind of junction. The absence of the steady state flow may be considered to be the definition of the solid-like properties while the substantial dilution may be necessary to give the relatively low modulus of gels. The solid nature may be achieved by a continuous network structure formed in the material generally through crosslinking the polymer chains through some kind of junction or the creation of domains of associated substituents of various branch chains of the polymer. The crosslinking can be either physical or chemical as long as the crosslink sites may be sustained at the use conditions of the gel.

Gels for use in this invention may be silicone (organopolysiloxane) gels, such as the fluid-extended systems taught in U.S. Pat. No. 4,634,207 to Debbaut (hereinafter "Debbaut '207"); U.S. Pat. No. 4,680,233 to Camin et al.; U.S. Pat. No. 4,777,063 to Dubrow et al.; and U.S. Pat. No. 5,079,300 to Dubrow et al. (hereinafter "Dubrow '300"), the disclosures of each of which are hereby incorporated herein by reference. These fluid-extended silicone gels may be created with non-reactive fluid extenders as in the previously recited patents or with an excess of a reactive liquid, e.g., a vinyl-rich silicone fluid, such that it acts like an extender, as exemplified by the Sylgard® 527 product commercially available from Dow-Corning of Midland, Mich. or as disclosed in U.S. Pat. No. 3,020,260 to Nelson. Because curing is generally involved in the preparation of these gels, they are sometimes referred to as thermosetting gels. The gel may be a silicone gel produced from a mixture of divinyl terminated polydimethylsiloxane, tetrakis (dimethylsiloxy)silane, a platinum divinyltetramethyldisiloxane complex, commercially available from United Chemical Technologies, Inc. of Bristol, Pa., polydimethylsiloxane, and 1,3,5,7-tetravinyltetra-methylcyclotetrasiloxane (reaction inhibitor for providing adequate pot life).

Other types of gels may be used, for example, polyurethane gels as taught in the aforementioned Debbaut '261 and U.S. Pat. No. 5,140,476 to Debbaut (hereinafter "Debbaut '476") and gels based on styrene-ethylene butylenestyrene (SEBS) or styrene-ethylene propylene-styrene (SEPS) extended with an extender oil of naphthenic or nonaromatic or low aramatic content hydrocarbon oil, as described in U.S. Pat. No. 4,369,284 to Chen; U.S. Pat. No. 4,716,183 to Gamarra et al.; and U.S. Pat. No. 4,942,270 to Gamarra. The SEBS and SEPS gels comprise glassy styrenic microphases interconnected by a fluid-extended elastomeric phase. The microphase-separated styrenic domains serve as the junction points in the systems. The SEBS and SEPS gels are examples of thermoplastic systems.

Another class of gels which may be used are EPDM rubber-based gels, as described in U.S. Pat. No. 5,177,143 to Chang et al.

Yet another class of gels which may be used are based on anhydride-containing polymers, as disclosed in WO 96/23007. These gels reportedly have good thermal resistance.

The gel may include a variety of additives, including stabilizers and antioxidants such as hindered phenols (e.g., Irganox™ 1076, commercially available from Ciba-Geigy Corp. of Tarrytown, N.Y.), phosphites Irgafos™ 168, commercially available from Ciba-Geigy Corp. of Tarrytown, N.Y.), metal deactivators (e.g., Irganox™ D1024 from Ciba-Geigy Corp. of Tarrytown, N.Y.), and sulfides (e.g., Cyanox LTDP, commercially available from American Cyanamid Co. of Wayne, N.J.), light stabilizers (e.g., Cyasorb UV-531, commercially available from American Cyanamid Co. of Wayne, N.J.), and flame retardants such as halogenated paraffins (e.g., Bromoklor 50, commercially available from Ferro Corp. of Hammond, Ind.) and/or phosphorous containing organic compounds (e.g., Fyrol PCF and Phosflex 390, both commercially available from Akzo Nobel Chemicals Inc. of Dobbs Ferry, N.Y.) and acid scavengers (e.g., DHT-4A, commercially available from Kyowa Chemical Industry Co. Ltd through Mitsui & Co. of Cleveland, Ohio, and hydrotalcite). Other suitable additives include colorants, biocides, tackifiers and the like described in "Additives for Plastics, Edition 1" published by D.A.T.A., Inc. and The International Plastics Selector, Inc., San Diego, Calif.

The hardness, stress relaxation, and tack may be measured using a Texture Technologies Texture Analyzer or like machine, having a load cell to measure force, a 5 gram trigger, and ¼ inch (6.35 mm) stainless steel probe. For measuring the hardness, for example, of a 20 mL glass vial containing 12 grams of gel, the probe is forced into the gel at the speed of 0.2 mm/sec to a penetration distance of 4.0 mm. The hardness of the gel is the force in grams required to force the probe at that speed to penetrate the gel specified for 4.0 mm. Higher numbers signify harder gels.

The tack and stress relaxation are read from the stress curve generated by tracing the force versus time curve experienced by the load cell when the penetration speed is 2.0 mm/second and the probe is forced into the gel a penetration distance of about 4.0 mm. The probe is held at 4.0 mm penetration for 1 minute and withdrawn at a speed of 2.00 mm/second. The stress relaxation is the ratio of the initial force ($F_i$) resisting the probe at the pre-set penetration depth minus the force resisting the probe ($F_f$) after 1 min divided by the initial force $F_i$, expressed as a percentage. That is, percent stress relaxation is equal to $$\frac{(F_i - F_f)}{F_i} \times 100\%. \qquad 1$$

where $F_i$ and $F_f$ are in grams. In other words, the stress relaxation is the ratio of the initial force minus the force after 1 minute over the initial force. It may be considered to be a measure of the ability of the gel to relax any induced compression placed on the gel. The tack may be considered to be the amount of force in grams resistance on the probe as it is pulled out of the gel when the probe is withdrawn at a speed of 2.0 mm/second from the preset penetration depth.

An alternative way to characterize the gels is by cone penetration parameters according to ASTM D-217 as proposed in Debbaut '261; Debbaut '207; Debbaut '746; and U.S. Pat. No. 5,357,057 to Debbaut et al., each of which is incorporated herein by reference in its entirety. Cone penetration ("CP") values may range from about 70 ($10^{-1}$ mm) to about 400 ($10^{-1}$ mm). Harder gels may generally have CP values from about 70 ($10^{-1}$ mm) to about 70 ($10^{-1}$ mm). Softer gels may generally have CP values from about 200 ($10^{-1}$ mm) to about 400 ($10^{-1}$ mm), with particularly preferred range of from about 250 ($10^{-1}$ mm) to about 375 ($10^{-1}$ mm). For a particular materials system, a relationship between CP and Voland gram hardness can be developed as proposed in U.S. Pat. No. 4,852,646 to Dittmer et al.

According to some embodiments, the gel has a Voland hardness, as measured by a texture analyzer, of between about 5 and 100 grams force. The gel may have an elongation, as measured by ASTM D-638, of at least 55%. According to some embodiments, the elongation is of at least 100%. The gel may have a stress relaxation of less than 80%. The gel may have a tack greater than about 1 gram.

While, in accordance with some embodiments, the sealants 170, 180 are gels as described above, other types of sealants may be employed. For example, the sealants 170, 180 may be silicone grease or hydrocarbon-based grease.

The enclosure assembly 100 may be formed in the following manner. The cover members 122, 124 can be molded (e.g., injection molded or vacuum formed). According to other embodiments, the cover members 122, 124 are integrally formed with a hinge and may be unitarily molded.

If the sealant 170, 180 is a material, such as a curable gel, that requires curing, the sealant may be cured in situ.

The enclosure assembly 100 can be used as follows in accordance with methods of the present invention to form the enclosed connection 9 (FIGS. 6-9). A connection 22 is first formed by installing the connector 16 on the conductors 12, 14. The sealant valve mechanisms 150 may be set or adjusted as described below to desirably control displacement of the sealant. Thereafter, the enclosure assembly 100 is installed over the connection 22 and portions of the conductors 12, 14. The enclosure assembly 100 may be held in an open position as shown in FIG. 1 and the connection 22 may be inserted into one of or between the cover members 122, 124. The enclosure assembly 100 is then closed by urging one or both of the cover members 122, 124 together as shown in FIGS. 6-9, and then secured in this position by installing tie wraps 30 through the tie slots 146. Latches or clips may be used to secure the cover members 122, 124, as well.

Figure 8:
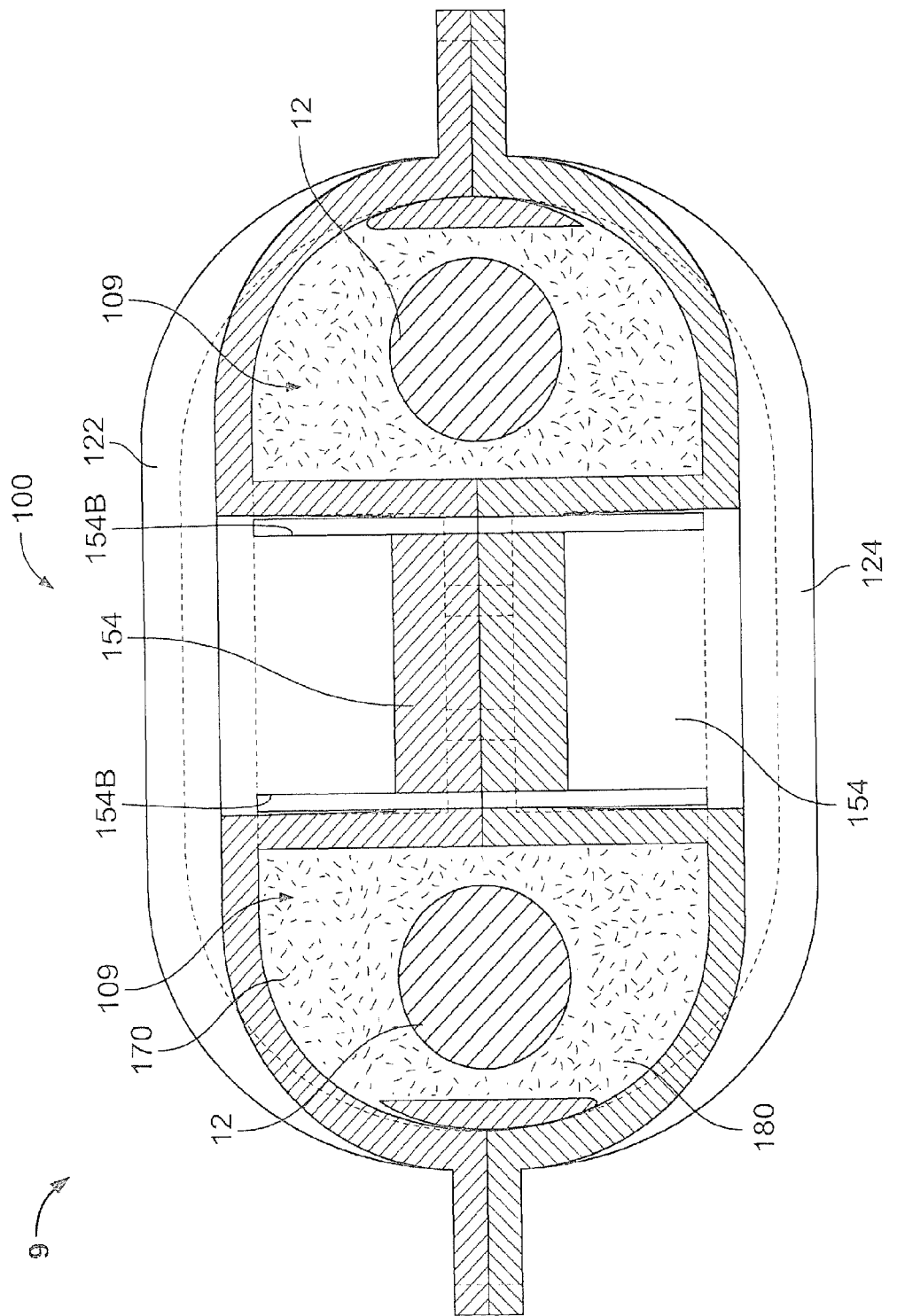
FIG. 8 is a cross-sectional view of the connection assembly of FIG. 6 taken along the line 8-8 of FIG. 7, wherein the gate members of the sealant-filled enclosure assembly are in their closed positions.

The closed housing 120 defines an enclosure cavity 106 including a main enclosure cavity and contiguous port channels 109 (FIG. 8; collectively defined by the port extensions 140). The connection 22 is encapsulated within the sealant 170, 180, and the sealant 170, 180 and the connection 22 are in turn encapsulated within the housing 120 (i.e., contained within the enclosure cavity 106). The portions of the conductors 12, 14 within the connection 22 and extending from the connection 22 and through the port channels 109 to the port walls 142 are likewise encapsulated in the sealant 170, 180.

Prior to or as the enclosure assembly 100 is closed, the conductors 12, 14 may break or splay the frangible walls 142 so that the conductors 12, 14 pass therethrough and are generally surrounded thereby. Because the walls 142 may be angled outwardly, they tend to be splayed outwardly by the conductors 12, 14.

According to some embodiments and as illustrated, the volumes and configurations of the sealants 170, 180 are selected to ensure that the connection 22 displaces at least one, and according to some embodiments, both of the sealants 170, 180 when the enclosure assembly 100 is transitioned from the opened position to the closed position with the connection 22 disposed therein.

According to some embodiments, the combined volume of the connector 16, the portions of the conductors 12, 14 in the enclosure cavity 106, and the sealants 170, 180 is greater than the volume of the enclosure cavity 106.

According to some embodiments, when the enclosure assembly 100 is installed as described herein, the closing of the cover members 122, 124 about the connection 22 forcibly displaces the sealants 170, 180 about the connector 16 such that the sealants 170, 180 flow around the connector 16 and, in some cases, into interstices within the connector 16. According to some embodiments, the sealants 170, 180 substantially fully encapsulate the connector 16.

The sealant valve mechanisms 150 may be used to adjust or tune the performance or effective capacity of the enclosure assembly 100. For example, the enclosure assembly 100 may be configured for use with connections 22 that are relatively large or small in size. In order to provide a satisfactory sealant seal for a small connection 22, at least a certain volume of the cavities 136 must be filled with the sealants 170, 180. However, when the enclosure assembly 100 is to be installed on a large connection 22, the connection 22 may displace so much sealant 170, 180 that the cover members 122, 124 cannot be closed without undue effort.

Figure 9:
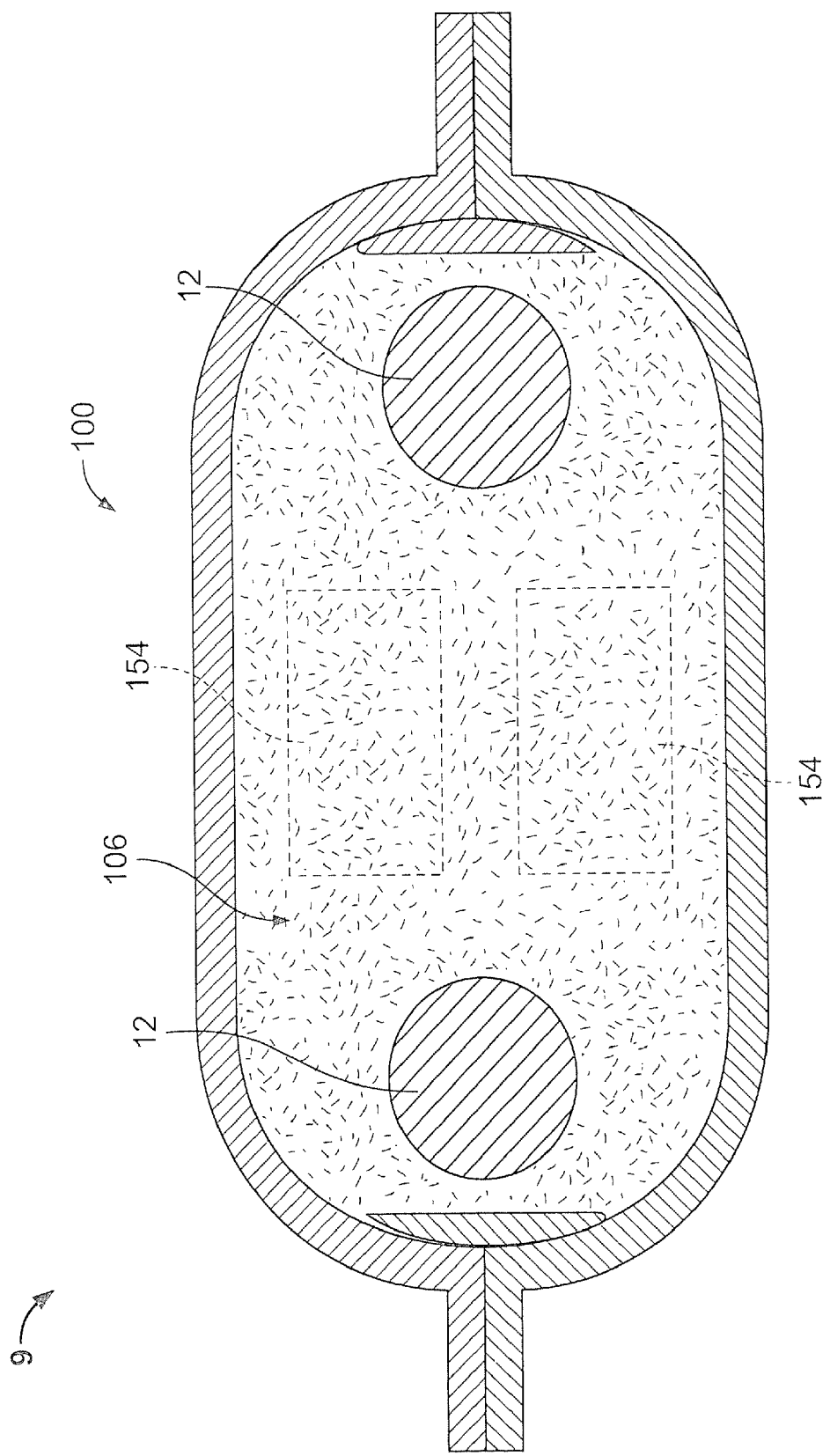
FIG. 9 is a cross-sectional view of the connection assembly of FIG. 6 taken along the line 9-9 of FIG. 7, wherein the gate members of the sealant-filled enclosure assembly are in their closed positions.

In the case of a small connection 22, the operator can leave the valve gate members 154 in their closed positions. The gate members 154 will remain closed and the sealants 170, 180 will be displaced in known manner when the cover members 122, 124 are closed, as shown in FIGS. 7-9. That is, the sealants 170, 180 are prevented from flowing into the chambers 156 by the gate members 154.

Figure 10:
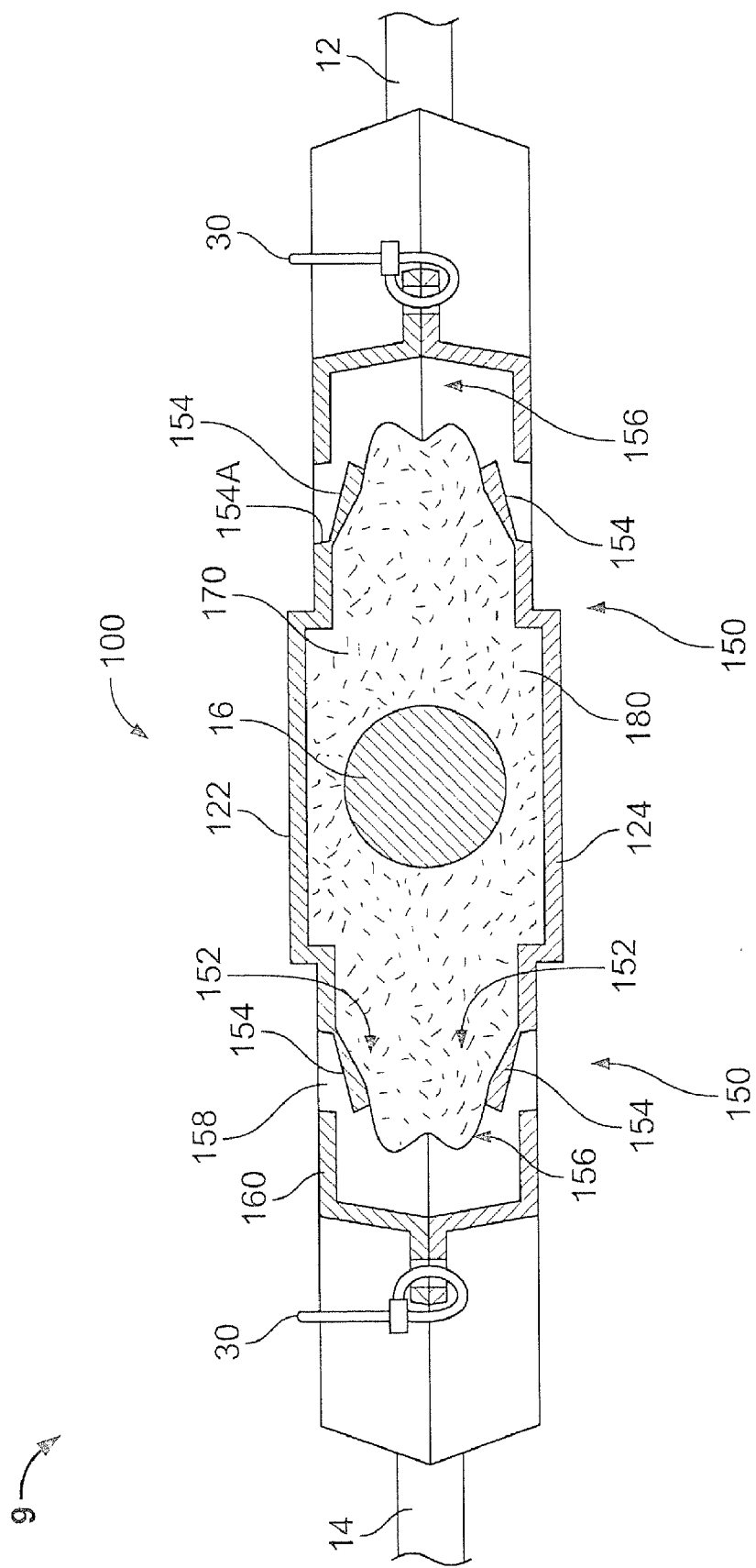
FIG. 10 is a cross-sectional view of the connection assembly of FIG. 6 taken along the line 7-7 of FIG. 6, wherein the gate members of the sealant-filled enclosure assembly are in their open positions.
Figure 11:
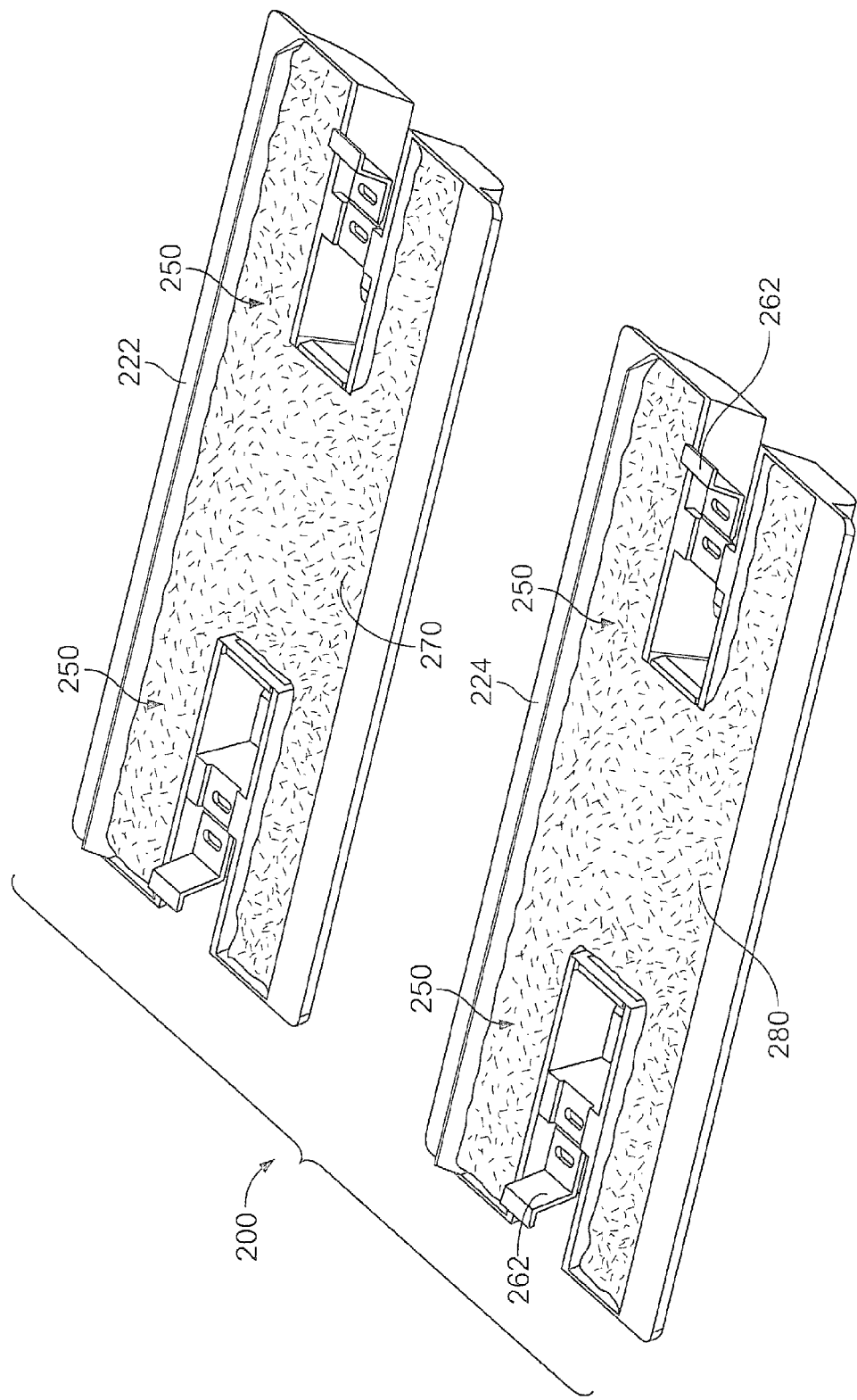
FIG. 11 is a top perspective view of a sealant-filled enclosure assembly according to further embodiments of the present invention in an open position.
Figure 12:
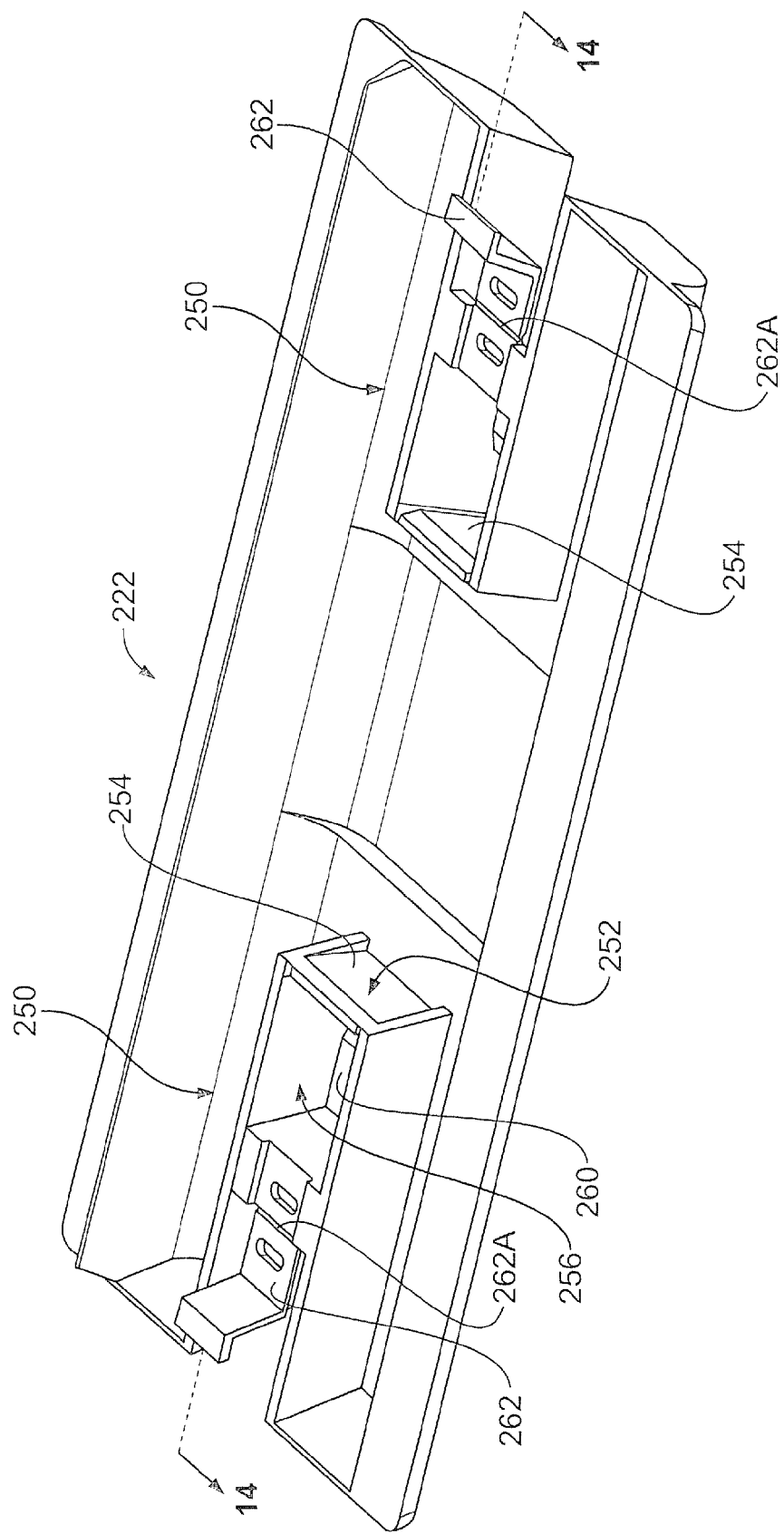
FIG. 12 is a top perspective view of a cover member of a housing forming a part of the sealant-filled enclosure assembly of FIG. 11 in an open position.
Figure 13:
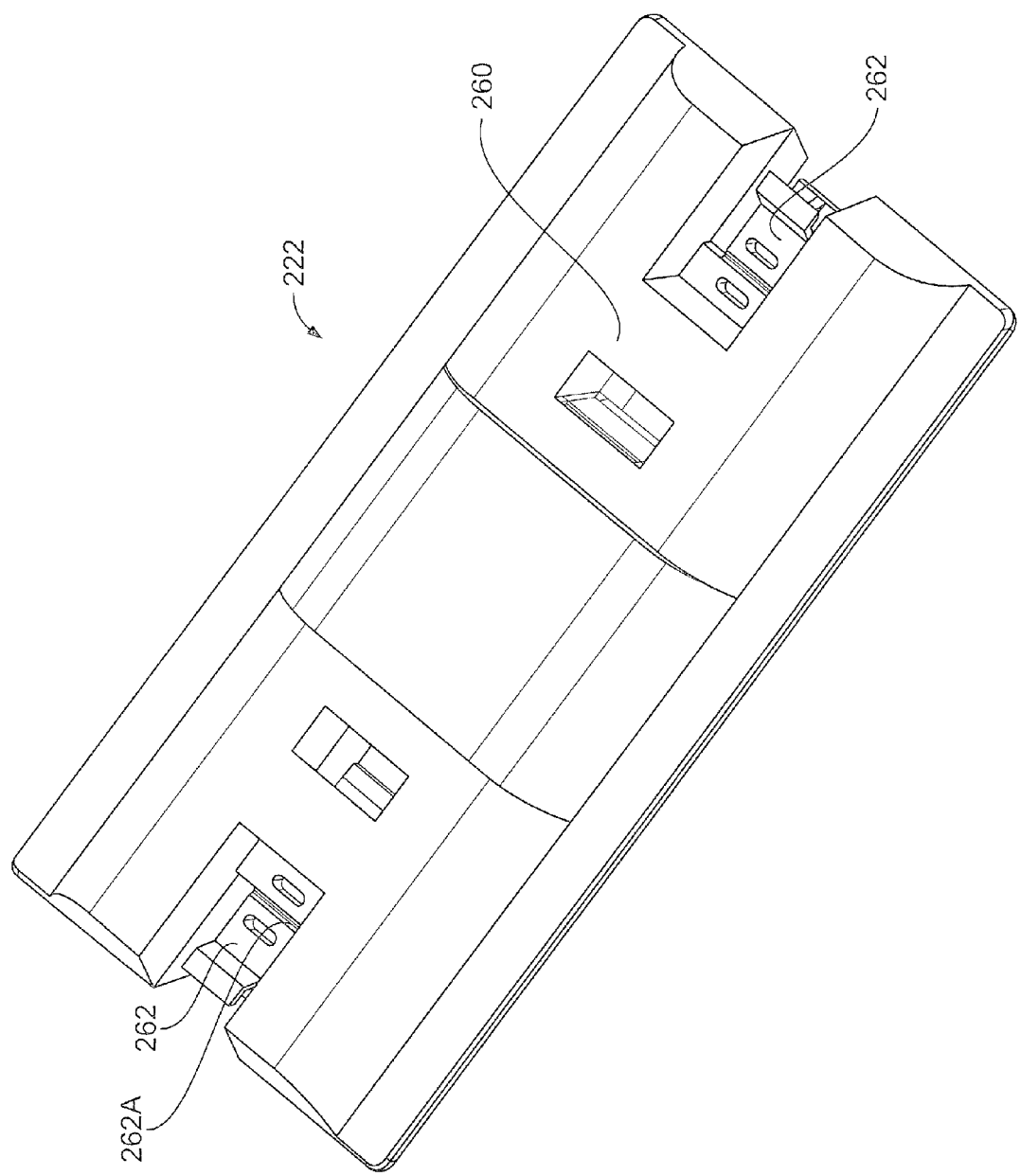
FIG. 13 is a bottom perspective view of the cover member of FIG. 12.
Figure 14:
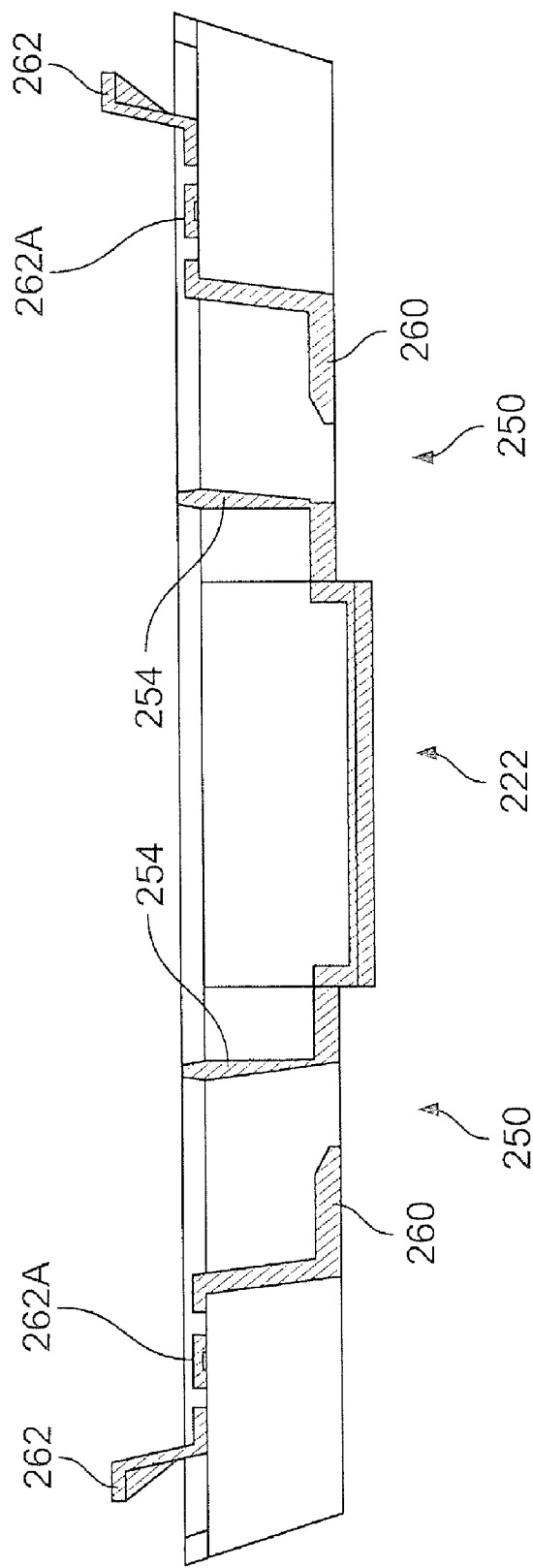
FIG. 14 is a cross-sectional view of the cover member of FIG. 12 taken along the line 14-14 of FIG. 12.

In the case of a large connection 22, the operator can break away the valve gate member 154 of each valve mechanism 150 and pivot it down about the hinge 154A into the confined space of the chamber 156 to open the valve port 152. As the cover members 122, 124 are closed, the displaced sealant 170, 180 will be expelled or exuded through the ports 152 and into the chambers 156 as shown in FIG. 10. In this manner, the effective volume of the cavity 106 is supplemented by the volumes of the chambers 156. As a result, the internal pressure of the sealant 170,180 is reduced, allowing easier closing of the cover members 122, 124.

As discussed above, according to some embodiments, each gate member 154 is substantially rigid or semi-rigid. According to some embodiments, the stiffness of each gate member 154 is sufficient to withstand a pressure from the interior side (i.e., the cavity 136 side) of at least 0.2 psi, and according to some embodiments at least 0.5 psi, without deforming or deflecting an amount sufficient to permit the sealant 170, 180 to pass through the corresponding port 152.

According to some embodiments, the connection(s) between each gate member 154 and the housing 120 (e.g., the frangible connector portions 154B) are sufficient to require at least 0.2 psi, and according to some embodiments at least 0.5 psi, of pressure on the interior side to break the gate member 154 away and open the corresponding port 152. According to some embodiments, a minimum gate opening force of at least 0.2 pounds-force, and according to some embodiments at least 0.5 pounds-force, must be applied to the gate member 154 in order to open the gate member.

Further levels of adjustment may be set as well. The operator may selectively open the gate members 154. For example, in one configuration, one of the gate members 154 may be open and the other gate member 154 remains closed.

While the foregoing procedures are described as including a step of the operator breaking away the gate members 154, according to some embodiments the operator does not break away the gate members 154. Instead, the gate member connector portions 154B are left intact and configured such that they automatically tear and permit the gate members 154 to be opened when the internal pressure of the sealant 170, 180 exceeds a prescribed threshold pressure. The threshold pressure may be exceeded during installation (i.e., as the cover members 122, 124 are being closed) or when the temperature of the sealant 170, 180 is elevated causing volumetric thermal expansion of the sealant 170, 180.

According to some embodiments, the volume of each chamber 156 when the associated gate member 154 is opened to the base stop 160 is in the range of from about 2 to 50 percent.

By selectively configuring the valve mechanisms 150, the operator may ensure that the housing 120 can be closed without requiring undue force, but nonetheless that the sealants 170, 180 are displaced and forced to flow about the connection 22 and also that the sealants 170, 180 sufficiently engage with one another at the interface between the cover members 122, 124 to provide adequate insulation and sealing.

The valve mechanisms 150 can also provide a controlled space for the sealant 170, 180 to expand into and out of and still maintain the desired insulation and sealing. For example, when pressure is created during a heating cycle, the sealant 170, 180 will expand into the chambers 156, and then recover and retract from the chambers 156 into the main cavity 106 as the sealant 170, 180 cools.

In some embodiments, an opening 156A is present in the housing 120 and connects the chamber 156 to the exterior of the housing 120. These openings 156A may be provided to facilitate molding of the housing 120. These openings 156A may also provide a path for air to escape from the chambers 156 as sealant 170, 180 enters the chambers 156. According to some embodiments, the housing 120 is configured such that the gate members 154 when open will close off at least a portion of the openings 156A to prevent or inhibit the sealant 170, 180 from escaping through the openings 156A (Le., provide a closed chamber 156). In some embodiments, the gate members 154 close off a majority of each associated opening 156A and, in some embodiments, fully close off the openings 156A.

While the valve mechanisms 150 are illustrated located between the conductor port subchannels 136B, other locations may be employed as appropriate for the intended cable/connector configurations.

As will be appreciated from the description herein, the sealant 170, 180 engages portions of the conductors 12, 14 to form seals thereabout. The sealant 170, 180 also forms a sealing block that surrounds the connector 16, thereby sealing the connector 16. Notably, in the illustrated enclosure assembly 100, the sealant masses 170, 180 connect with one another to encapsulate the connector 16 and conductors 12, 14.

The enclosure assembly 100 may be sized and configured to accommodate and seal multiple or a range of sizes of connectors 16 and conductors 12, 14.

The enclosure assembly 100 may provide a number of advantages. The enclosure assembly 100 may provide a reliable seal about the connection 22. This seal may prevent or inhibit the ingress of moisture that would otherwise cause corrosion of the connection 22. The sealant 170, 180, particularly gel sealant, may accommodate conductors of different sizes within a prescribed range. The interfacing sealant masses 170, 180 and the relationship between the connector or connection volume and the sealant volumes may ensure that a suitable seal is provided by and between the sealant masses for a broadened range of sizes connections 22 positioned in the enclosure assembly 100.

When the sealant 170, 180 is a gel, the conductors 12, 14 and the housing 120 may apply a compressive force to the sealant 170, 180 as the assembly 100 is transitioned from the open position to the closed position. The gel may thereby be elongated and be generally deformed and substantially conform to the outer surfaces of the connector 16, the conductors 12, 14 and to the inner surface of the housing 120. Some shearing of the gel may occur as well. At least some of the gel deformation may be elastic. The restoring force in the gel resulting from this elastic deformation generally causes the gel to operate as a spring exerting an outward force between the housing 120 and the connector 16 and the conductors 12, 14. The compressive loading and restoring force are maintained by the closure of the cover members 122, 124.

Various properties of the gel as described above may ensure that the gel sealant 170, 180 maintains a reliable and long lasting seal between the housing 120 and the connector 16 and the conductors 12, 14. The elastic memory of and the retained or restoring force in the elongated, elastically deformed gel generally cause the gel to bear against the mating surfaces of the connector 16, the conductors 12, 14 and the interior surface of the housing 120. Also, the tack of the gel may provide adhesion between the gel and these surfaces. The gel, even though it is cold-applied, is generally able to flow about the connector 16, the conductors 12, 14 and the housing 120 to accommodate their irregular geometries.

According to some embodiments, the sealant 170, 180 is a self-healing or self-amalgamating gel. This characteristic, combined with the aforementioned compressive force between the connector 16, conductors 12, 14 and the housing 120, may allow the sealant 170, 180 to re-form into a continuous body if the gel is sheared by the insertion of the conductors 12, 14 into the enclosure assembly 100. The gel may also re-form if the connector 16 and conductors 12, 14 are withdrawn from the gel.

The sealant 170, 180, particularly when formed of a gel as described herein, may provide a reliable moisture barrier for the conductors 12, 14 and the connector 16, even when the enclosure assembly 100 is subjected to extreme temperatures and temperature changes. The housing 120 may be made from an abrasion resistant material that resists being punctured by the abrasive forces.

The gel sealant may also serve to prevent or inhibit corrosion of the connection 22 by depositing a layer of oil from the gel on the exposed surfaces of the connector 16 and conductor portions 12, 14 in the enclosure cavity 106. Even if the gel is removed from the connection 22, the oil may remain to coat the connection surfaces as a barrier to moisture.

With reference to FIGS. 11-15, a sealant-filled enclosure assembly 200 according to further embodiments of the present invention is shown therein. The enclosure assembly 200 is constructed in the same manner as the enclosure assembly 100 except that each valve mechanism 250 (corresponding to the valve mechanism 150) of the enclosure assembly 200 further includes a supplemental stop member or tab 262 pivotally mounted via a living hinge 262A.

In use, the operator may selectively configure the enclosure assembly 200 to accommodate a small, medium or large connection 22. Configuration for a small or large connection 22 can be executed as discussed above with regard to the enclosure assembly 100.

Figure 15:
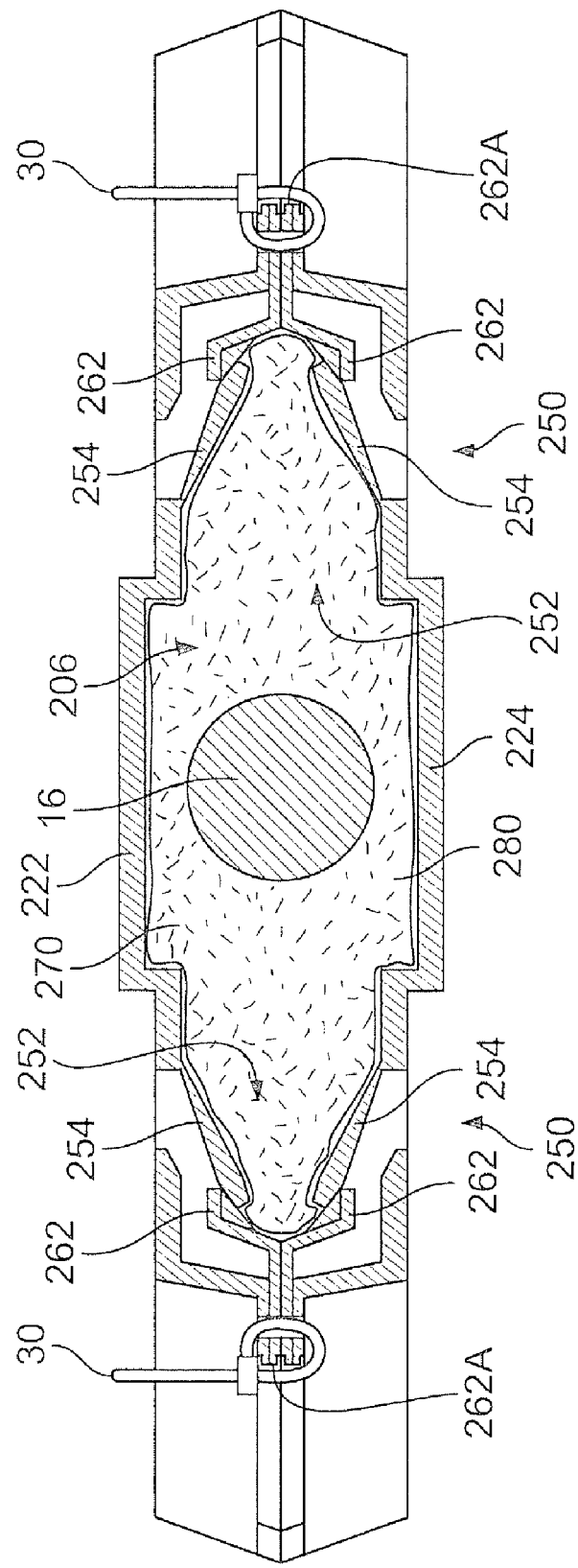
FIG. 15 is a longitudinal, center cross-sectional view of the sealant-filled enclosure assembly of FIG. 11 installed on a connection to form a connection assembly, wherein the gate members thereof are in their open positions and supplemental stop members of the sealant-filled enclosure assembly are in their deployed positions.

In the case of a medium connection 22, the operator can bend each supplemental stop member 262 from its stored position (FIGS. 11 and 14) to a deployed position (FIG. 15). The operator can break away the valve gate member 254 of each valve mechanism 250 and pivot it down about the hinge 254A to open the valve port 252. As the cover members 222, 224 are closed, the displaced sealant 270, 280 will be expelled or exuded through the ports 252 and into the chambers 256. The pivot of the gate members 254 is limited by the respective supplemental stop member 262. In this manner, the effective volume of the cavity 206 is supplemented by the volumes of the chambers 256. However, because the gate member 254 is only permitted to pivot to a partially open position, the supplemental volume provided by the chambers 256 will be less than in the case where the gate members 254 are opened to the base stops 260. Thus, each valve mechanism 250 can be selectively adjusted to provide three different volumes to contain the sealant 170, 180.

According to some embodiments, the volume of each chamber 256 when the associated gate member 254 is opened to the base stop 260 is in the range of from about 1 to 50 percent and the volume of each chamber 256 when the associated gate member 254 is opened to the supplemental stop member 262 is in the range of from about 1 to 25 percent.

As will be appreciated from the description herein, enclosure assemblies according to the present invention may be provided as pre-formed and fully assembled units, with pre-cured gel or other sealant therein as described above, that may be cold applied about a connection to form a seal.

It will be appreciated that enclosures in accordance with the present invention may have components (e.g., cover members, walls, etc.) and cavities or chambers having shapes, configurations and/or sizes different than those shown and described herein.

Embodiments of the present invention have been described above and, although specific terms are employed, they are used in a generic and descriptive sense only and not for purposes of limitation. The following claim is provided to ensure that the present application meets all statutory requirements as a priority application in all jurisdictions and shall not be construed as setting forth the scope of the present invention.

That which is claimed is:

1. A sealant-filled enclosure assembly for environmentally protecting a connection, the sealant-filled enclosure assembly comprising:
    a housing including a plurality of walls defining a main cavity to receive the connection;
    a mass of sealant disposed in the main cavity; and
    a sealant valve mechanism including:
        an overflow chamber; and
        a gate member between the main cavity and the overflow chamber;
        wherein the gate member is selectively positionable in each of a closed position, wherein the gate member substantially prevents displacement of the sealant from the main cavity to the overflow chamber, and an open position, wherein the gate member permits displacement of the sealant from the main cavity to the overflow chamber.

2. The sealant-filled enclosure assembly of claim 1 wherein:
    the housing is selectively configurable in an open position to receive the connection and a closed position to contain the connection; and
    the housing is configured such that, when the housing is closed about the connection, the connection will displace an overflow portion of the sealant from the main cavity into the overflow chamber.

3. The sealant-filled enclosure assembly of claim 2 wherein the sealant valve mechanism is configured such that the gate member can be repositioned by an operator from the closed position to the open position prior to closing the housing.

4. The sealant-filled enclosure assembly of claim 1 wherein the sealant valve mechanism is configured such that the gate member will open automatically in response to an internal pressure of the sealant in the main cavity exceeding a prescribed threshold pressure.

5. The sealant-filled enclosure assembly of claim 4 wherein the sealant valve mechanism is configured such that the gate member will open automatically in response to an internal pressure of the sealant in the main cavity exceeding the prescribed threshold pressure due to volumetric thermal expansion of the sealant in service.

6. The sealant-filled enclosure assembly of claim 1 wherein:
    the gate member is positionable in each of first and second prescribed open positions wherein the gate member permits displacement of the sealant from the main cavity to the overflow chamber;
    the first open position and the second open position are different from one another and provide a first overflow volume and a second overflow volume, respectively, in the overflow chamber to receive the sealant displaced from the main cavity; and
    the second overflow volume is larger than the first overflow volume.

7. The sealant-filled enclosure assembly of claim 6 including a supplemental stop member selectively operable to limit the gate member to the first open position.

8. The sealant-filled enclosure assembly of claim 1 wherein the housing includes a cover member and the gate member is integrally and unitarily molded with the cover member.

9. The sealant-filled enclosure assembly of claim 8 wherein the gate member is joined to the cover member by a living hinge and is pivotable about the living hinge between the closed position and the open position.

10. The sealant-filled enclosure assembly of claim 8 wherein:
the gate member is joined to the cover member in the closed position by a frangible connection portion; and
the frangible connection portion must be torn in order to reposition the gate member from its closed position to its open position.

11. The sealant-filled enclosure assembly of claim 1 including a second sealant valve mechanism including:
a second overflow chamber; and
a second gate member between the main cavity and the second overflow chamber;
wherein the second gate member is selectively positionable in each of a closed position, wherein the second gate member substantially prevents displacement of the sealant from the main cavity to the second overflow chamber, and an open position, wherein the second gate member permits displacement of the sealant from the main cavity to the second overflow chamber.

12. The sealant-filled enclosure assembly of claim 1 wherein the sealant valve mechanism includes an outlet between the overflow chamber and the environment.

13. The sealant-filled enclosure assembly of claim 12 wherein the gate member, when in the open position, closes at least a portion of the outlet.

14. The sealant-filled enclosure assembly of claim 1 wherein the housing defines a pair of opposed cable channels to receive cables extending into the main cavity and the gate member is interposed between the cable channels.

15. The sealant-filled enclosure assembly of claim 1 wherein the sealant is an elastically elongatable gel.

16. The sealant-filled assembly of claim 1 wherein the housing includes first and second cover members that collectively define the main cavity.

17. A method for environmentally protecting a cable connection, the method comprising:
providing a sealant-filled enclosure assembly including:
a housing including a plurality of walls defining a main cavity to receive the connection;
a mass of sealant disposed in the main cavity; and
a sealant valve mechanism including:
an overflow chamber; and
a gate member between the main cavity and the overflow chamber;
wherein the gate member is selectively positionable in each of a closed position, wherein the gate member substantially prevents displacement of the sealant from the main cavity to the overflow chamber, and an open position, wherein the gate member permits displacement of the sealant from the main cavity to the overflow chamber;
placing the connection in the main cavity;
transitioning the gate member from the closed position to the open position; and
displacing a portion of the sealant from the main cavity to the overflow chamber.

18. The method of claim 17 wherein:
the housing is selectively configurable in an open position to receive the connection and a closed position to contain the connection; and
displacing a portion of the sealant from the main cavity to the overflow chamber includes closing the housing about the connection.

19. The method of claim 18 wherein transitioning the gate member from the closed position to the open position includes deliberately repositioning the gate member from the closed position to the open position prior to closing the housing about the connection.

20. The method of claim 17 wherein transitioning the gate member from the closed position to the open position includes the gate member automatically opening in response to an internal pressure of the sealant in the main cavity exceeding a prescribed threshold pressure.

21. The method of claim 17 wherein the sealant is an elastically elongatable gel.

* * * * *